Patented Nov. 20, 1945

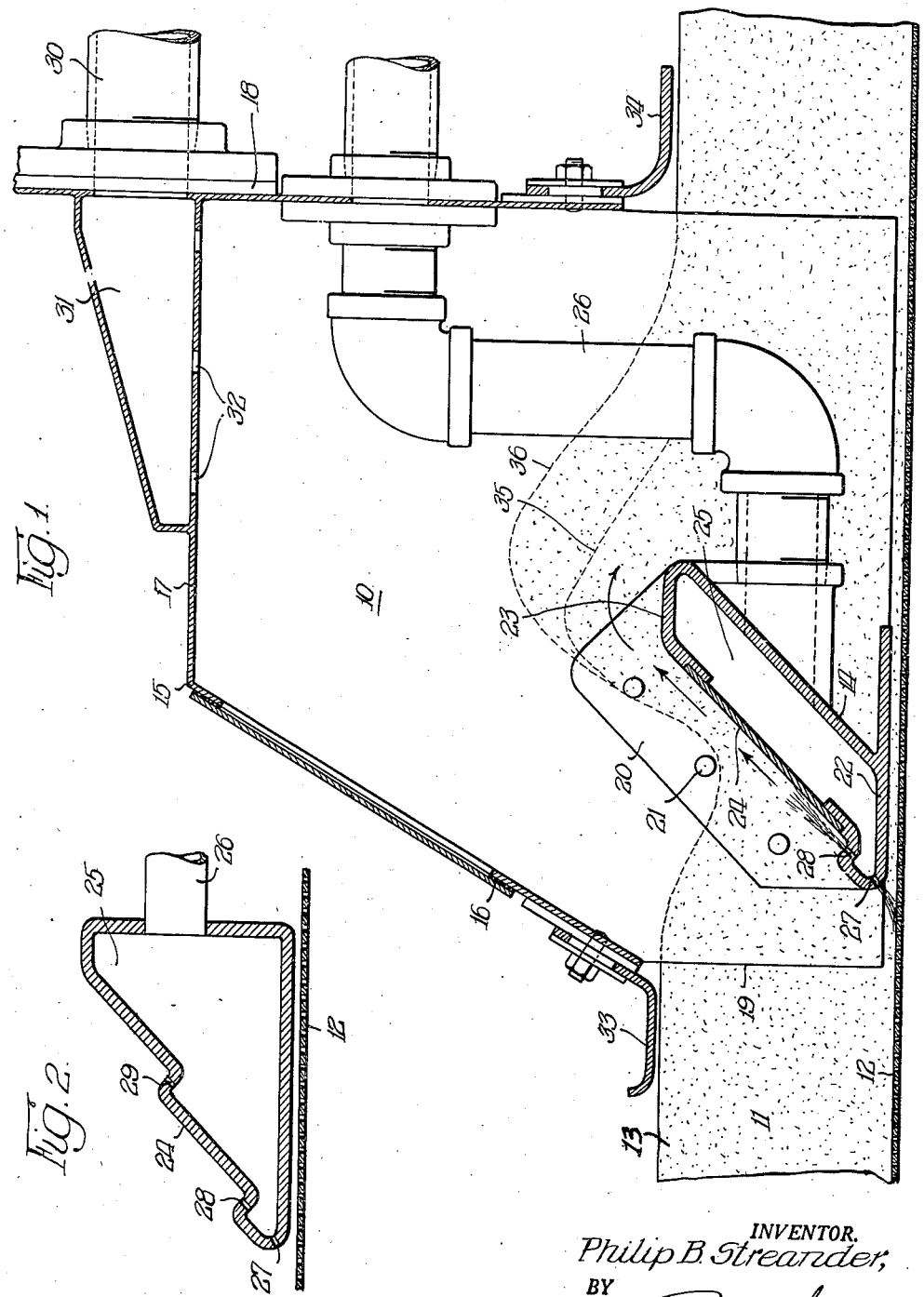

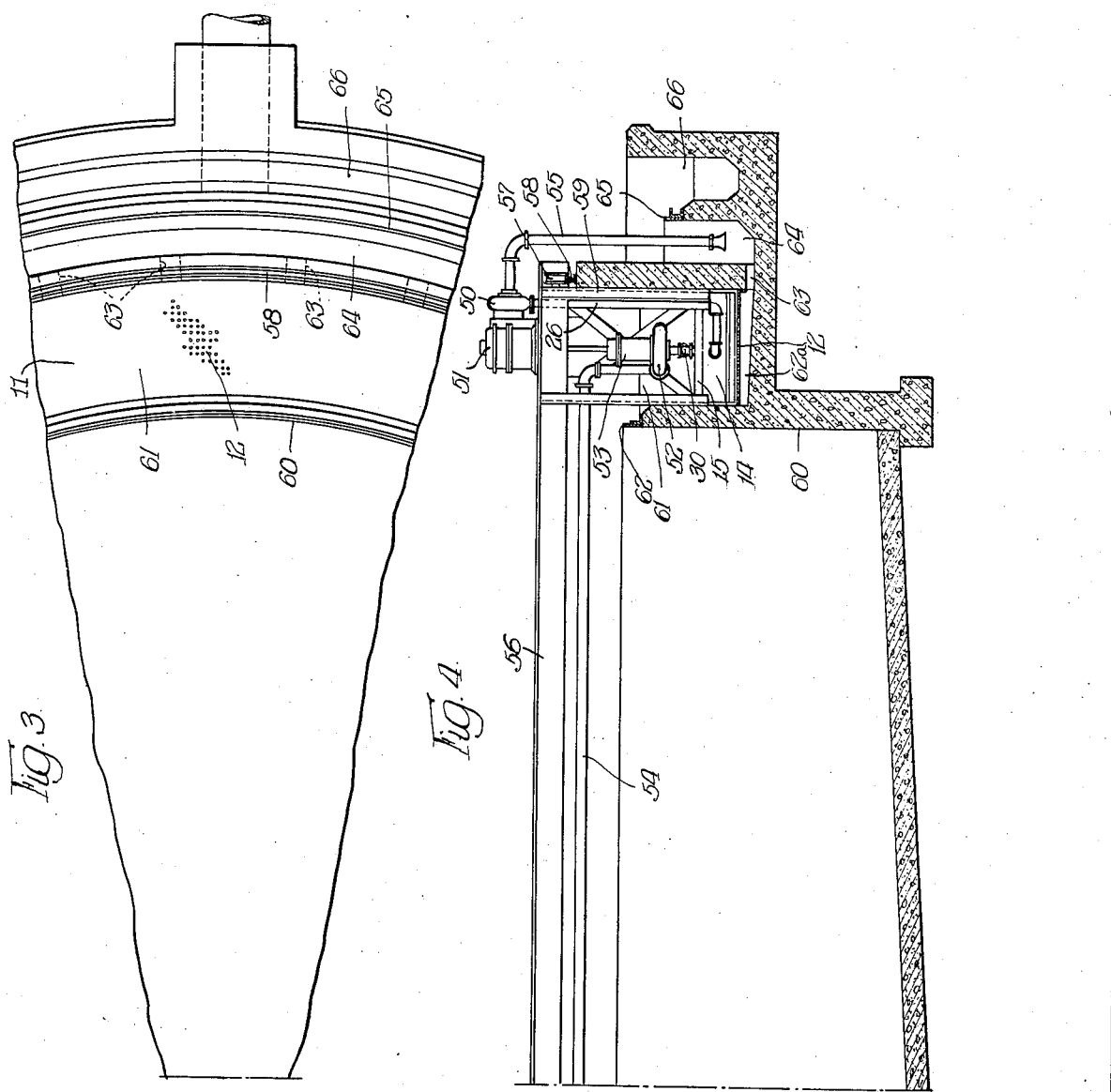

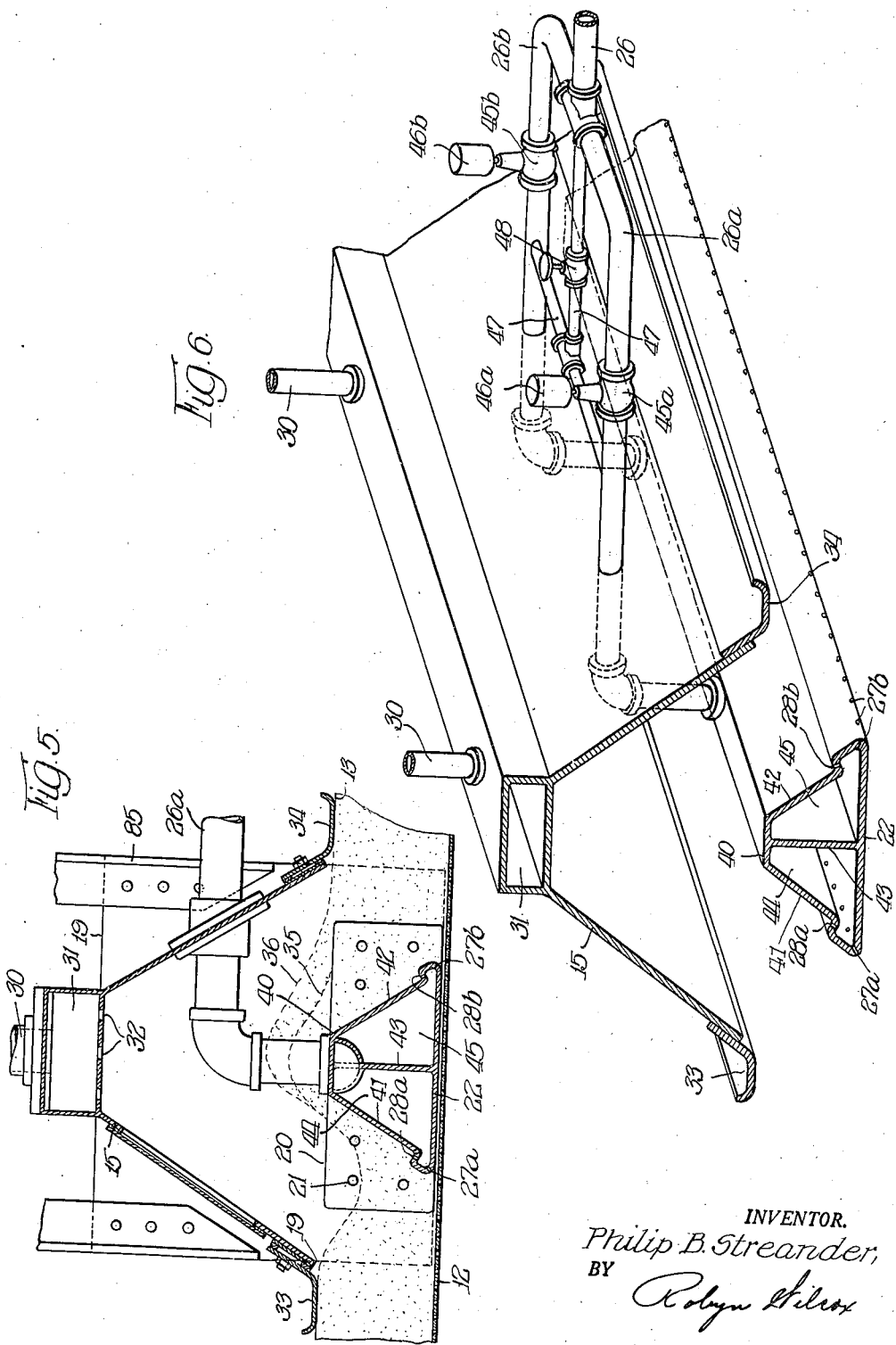

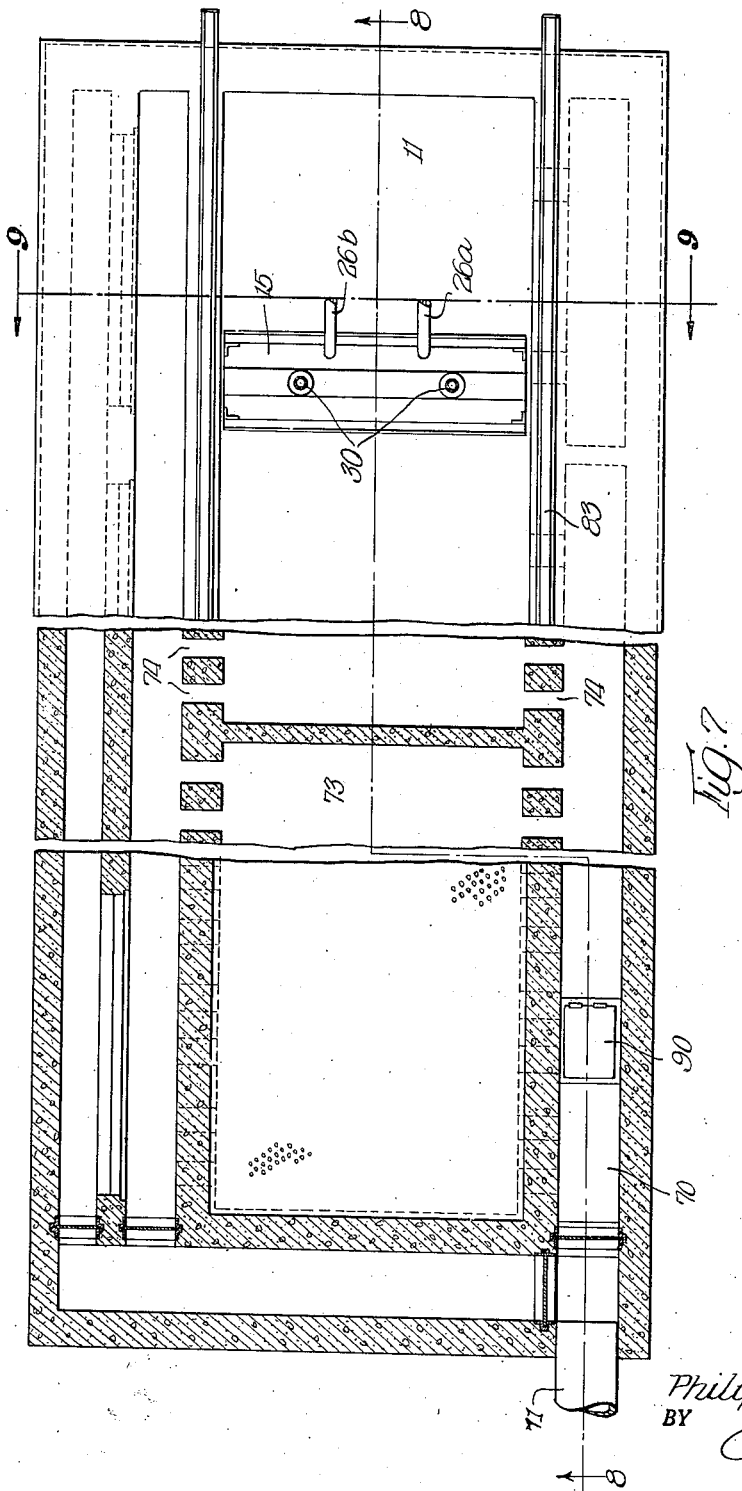

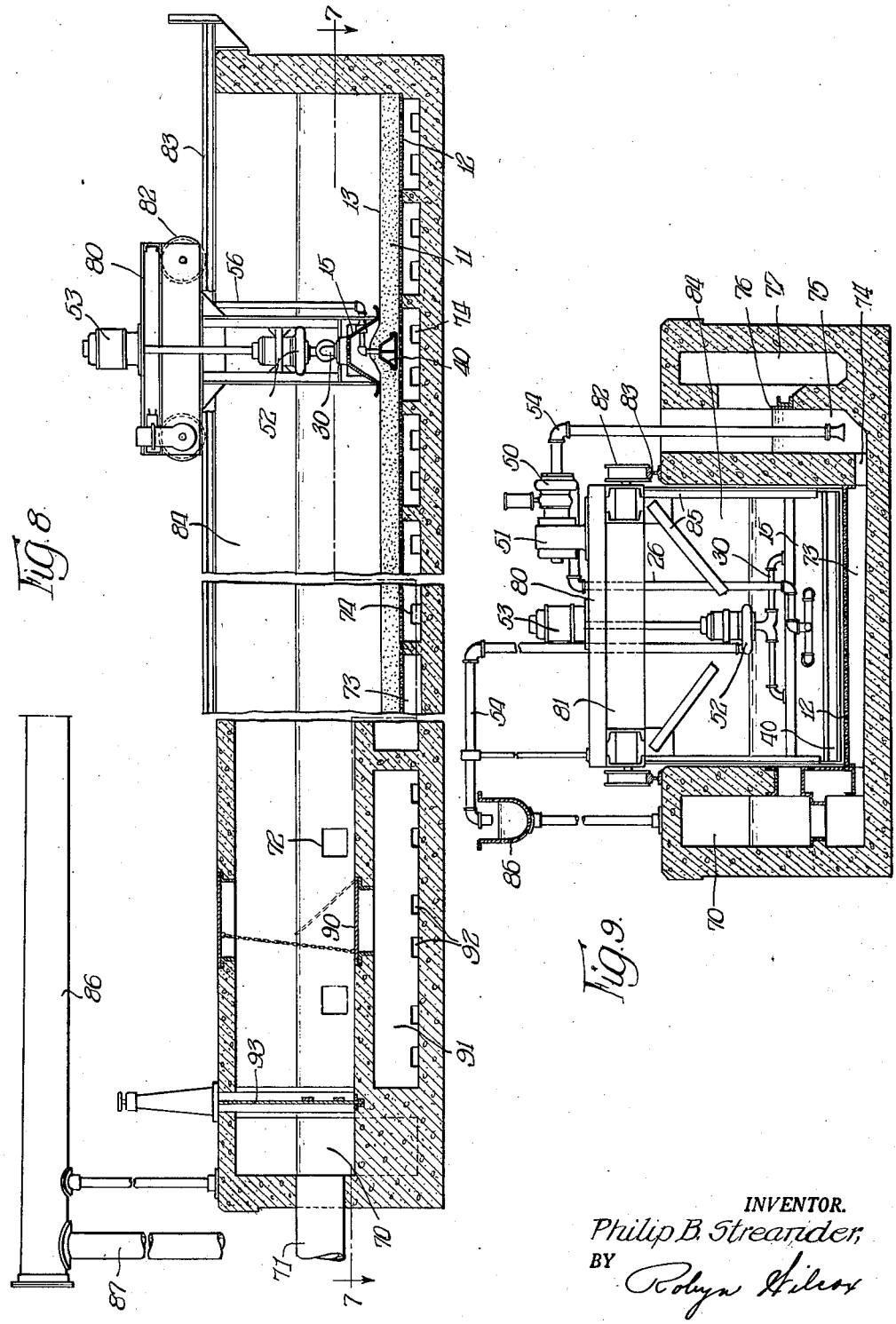

2,389,329

UNITED STATES PATENT OFFICE 2,389,329

FILTER BED CLEANING

Philip B. Streander, Maplewood, N. J.

Application February 14, 1941, Serial No. 378,931

19 Claims. (Cl. 210—128)

This invention relates to filter bed cleaning, and more particularly to filter bed-cleaning means adapted to travel over and through the filter bed to agitate the same and remove the solids retained in the filter bed during filtering operations and to reclassify the filter bed material after such cleaning. The main object of the invention is to provide for novel, advantageous and thorough cleaning of the filter bed.

Another object of the invention is to provide novel and advantageous cleaning means with a positive action throughout the full depth of the filter bed whereby it is possible to withdraw the extraneous solids from the full section of the bed.

It has heretofore been known to wash the top of a filter bed or to provide nozzles extending down into the filter bed, but so far as I am aware it has not been known in movable filter bed cleaners to positively lift substantially all of the filter material in the bed, to scour and wash it while so lifted and to regrade the material as it is replaced in the bed. One of the novel features of my invention is to hydraulically lift all of the filter material from the bed, wash and scour it, and reclassify or regrade it in one operation. To this end I provide a plow the full width of the bed and of a height corresponding to the depth of the filter material, which plow moves laterally through the bed. The plow is provided with jets which undercut the filter material in front of it, and redeposit it, after washing and scouring, behind the plow. I also provide a caisson or hood over the plow to confine the washing and scouring to the immediate vicinity of the plow and to collect and remove dirty water.

One object of my invention, therefore, is to positively wash and scour substantially all of the material in the filter bed.

Another object of the invention is to provide an improved means for reclassifying filter bed material after such cleaning.

A still further object of the invention is to provide a relatively small filter cleaning apparatus which moves over and through the bed, picking up and agitating substantially all of the material of the bed to dislodge dirt and other extraneous solids therefrom, and to reclassify and replace the filter bed material after such cleaning.

In carrying out the invention, use may be made of a settling tank, or a fine screen, whereby a certain part of the sludge or foreign solid matter may be removed, before removal of additional solids by filtration, the period of time required for these two operations being decidedly short compared with the long periods required to produce the same effect by settling alone, or by the fineness of screen and size of screening plant that would otherwise be required. Such removal of solids may be effected with, or without, the use of chemicals or other extraneous substances.

The filter may be composed of any suitable fine grained material such as a silica-sand, a fine coal, crushed stone or marble, or any other granular material suitable for the filter medium. The filter media may be mounted on a perforated plate, or a suitably supported and reinforced wire mesh. The filter bed may be of the depth required to remove the solids but, for most applications, this would probably be not less than 6 inches nor more than 12 inches. The filter bed may take whatever form is required to economically build the unit and may be built around the periphery of a circular settling tank, or it may be built as a separate unit in which case it may be rectangular in shape, or it may be contained with an annular channel between two concentric walls.

In substantially all instances the filter would comprise an upper chamber to receive the liquid to be filtered, a filter medium, and a lower chamber to receive the filtrate. Further, the arrangement may be such that liquid can be by-passed around the upper chamber directly into the lower chamber without passing through the filter bed. This may be done by providing movable diversion gates, in the influent channel to the filter bed, that can be lifted, allowing the liquid to flow directly into the lower chamber. The purpose of the by-passing may be to flush out the lower chamber by passing the liquid through restricted ports, at a high velocity, and collecting it at the opposite side of the bed in the outflow or effluent channel. The filter bed may also be provided with an overflow effluent weir to control the flow of the liquid through the bed and to maintain the liquid over the filter bed at the depth of liquid required for operation of the bed and the cleaner.

Provision may also be made as heretofore to mount the cleaner mechanism on a suitable traveling bridge or carriage, arranged over the filter compartment, by means of which the cleaner is made to travel over and through the filter medium, so that, when in use, the retained solids may be continuously or intermittently removed. The cleaner bridge may be mounted separately on rails as in Streander No. 2,086,829, July 13, 1937, or it may form a part of other mountings as in Lose Patent No. 2,235,227. When the liquid rises to any predetermined level over the effluent or control weir, suitable devices are, or may be, shifted, as by float control such as shown in said Streander patent, causing the movement of the bridge or carriage, on which the cleaner is mounted, over the filter compartment. Suitable controls are inter-connected with the float switch, or other control use, to make the cleaner operative.

Other objects, features and advantages will appear upon consideration of the following description and of the drawings in which:

Figure 1 is a vertical sectional elevation of a form of apparatus adapted to travel in one direction only, as, for example, a cleaner for an annular filter bed.

Figure 2 is a vertical sectional elevation of a modification of the plow or barrier shown in Figure 1, and having two rows of upwardly inclined nozzles.

Figure 3 is a small scale, partial plan view of a circular settling tank surrounded by an annular filter, such as a structure in which the cleaner of Figure 1 is designed to operate.

Figure 4 is a partial vertical sectional view of the combined settling and filtering tank shown in Figure 3, together with a cleaner in place.

Figure 5 is a vertical cross-sectional elevation of another embodiment of the invention which is designed to travel in both directions, as for use in a rectangular filter bed.

Figure 6 is an enlarged perspective view, partly in section, of the embodiment shown in Figure 5.

Figure 7 is a partial plan view, partly in section, of a rectangular filter utilizing a device of the type shown in Figures 5 and 6, taken along the planes designated by the lines 7—7 of Figure 8, together with a cleaner in operating position.

Figure 8 is a longitudinal vertical section of the rectangular filter bed shown in Figure 7, taken along the planes designated by the lines 8—8 of Figure 7.

Figure 9 is a transverse cross-section of the rectangular filter bed shown in Figure 7, taken along the plane designated by the line 9—9 in Figure 7, with filter bed material removed.

Figure 1 illustrates a "one-way" cleaner, such as is adapted for use in a circular or annular filter in which the cleaner, 10, moves in one direction (in the drawing shown as to the left) only. The cleaner is shown in an operating position in a filter bed 11 of discrete material which is supported by a perforated plate 12, and the upper surface of which is designated by 13. The cleaner 10 comprises a cleaner head, or plow 14 of the full filter bed depth and a classifier head or caisson 15. The caisson is preferably so constructed as to provide a rearwardly sloping front face 16, top 17, rear wall 18, and ends 19. It is preferred that the caisson, or hood, 15 extend the entire width of the filter bed 11 so as to provide for thorough cleaning of all of the bed 11 in one passage of the cleaner 10 therethrough. The ends 19 should therefore be placed as close to the side walls of the filter chamber as practical.

The plow 14 should also extend the full width of the filter, and preferably its ends will be rigidly attached to the end 19 of the caisson, as by end flange 20, which can be riveted, as by rivets 21, to the end plate 19. The bottom 22 of the plow or barrier 14 should be immediately adjacent the perforated plate 12 which supports the filter 11. It is preferred that the upper face 23 of the plow 14 be at approximately the elevation of the upper surface 13 of the filter 11; so as to provide for a positive lifting and washing of all of the material in the filter bed. It is, therefore, preferred that the height of the cleaner head 14 correspond to the depth of the filter medium 11. It is also preferred that the forward, or leading, face 24 of the cleaner head 14 be inclined toward the rear, as shown, in order to facilitate the lifting of all of the discrete filter material over the plow so that it can be thoroughly washed and cleaned. The interior of the cleaner head 14 provides a distribution conduit 25 leading from an inlet pipe 26, which pipe supplies liquid under pressure to a row of orifices or nozzles 27 discharging downwardly from the lower leading edge of the cleaner head 14 and an upwardly discharging row of nozzles 28 in the lower portion of the leading face 24 of the cleaner head. Although only one row of upwardly discharging nozzles 28 is shown in Figure 1, it should be understood that a plurality of rows at different heights may be used, as shown in Figure 2, in which an upper row of upwardly discharging nozzles 29 is shown on the leading face 24 of the head at an intermediate level thereof. An outlet pipe 30 leads from the classifier head 15 for the purpose of taking away the waste liquid containing the solids removed from the material of the filter bed. As shown in the drawings, the outlet pipe 30 leads from a collecting chamber 31, which communicates with the upper portion of the caisson, or hood 15 through spaced ports 32. The classifier head 15 has also adjustable sand shoes 33 and 34 at the lower edges of the front and back walls 16 and 18, to confine the cleaning action within the limits of the classifier head and to level the sand as the cleaner passes over the filter bed. The classifier head 15 and the cleaner head 14 are mounted respectively over and in the filter bed 11 by any suitable means from a carriage, as shown in Figure 4, adapted to horizontally move the cleaner head 14, through, and the caisson 15 over, the filter bed. As the classifier head or caisson 15 and plow, or cleaner head 14 move to the left, as shown in the figure, the sand shoes 33 and 34 ride along the top 13 of the bed, and the water under pressure flows through the inlet pipe 26 into the plow or cleaner head 14 and is discharged through the rows of orifices or nozzles 27 and 28. The water passing out of the downwardly pointing nozzles 27 loosens up the bed close to the screen or perforated plate 12 and the sand thus loosened is passed upwardly by means of the upwardly directed nozzles 28 along the forward side of the cleaner head 14 so as to pass over the top of said head and fall to the rear thereof. Obviously, the larger and heavier particles fall first, thus classifying the material in layers, as shown in the figure in which the lower dotted line 35 designates the upper limit of the coarser and heavier filter particles and the upper line 36 designates the upper limits of the lighter of such particles.

The cleaner shown in Figures 5 and 6 is the same in principle as the one shown in Figure 1, excepting that it is used for a two directional travel. The structure of this type of cleaner differs from that shown in Figure 1 only in those parts which it is desirable to change when the direction of movement of the cleaner is reversed from time to time. The cleaner head 40 is preferably provided with both faces 41 and 42 inclined as shown. Each face is provided with downwardly pointing orifices or nozzles 27a and 27b respectively; and at least one row of upwardly directed discharge jets 28a and 28b respectively, the same as the leading face of the "one-way" cleaner. The caisson, or hood, is similar in construction to that of Figure 1, although both faces may be sloping, if desired, as shown in this figure. In addition to these parts which are similar to those of Figure 1, there is shown in Figure 5 a divisional wall 43 which separates the cleaner head 40 into two chambers 44 and 45, the forward one of which will serve as the distribution conduit connecting the supply pipe 26 to the cleaning nozzles then in operation. Figure 5 shows a "two-way" cleaner as moving toward the left, in which event the left-hand chamber 44 would be utilized to supply water under pressure to the left-hand nozzles 27a and 28a, while there would be, at most, a relatively small flow through the right-hand chamber 44 and its orifices 27b and 28b. Each chamber of this cleaner head is also desirably provided with a separate, or branch, pressure liquid pipe connection 26a and 26b which connect the two chambers 44 and 45, respectively, to the inlet pipe 26. The branch pipes, 26a and 26b, will be provided with suitable means for selectively connecting the inlet pipe 26 to one or the other of the distribution chambers 44 or 45, depending upon the direction of travel of the cleaner. Several such means are known, but for purposes of illustration I show valves 45a, in branch conduit 26a, and 45b, in branch conduit 26b, each of which is operated by a solenoid 46a and 46b respectively. The two solenoids 46a and 46b should be so interconnected that when one is operated to open the valve connected to it the other will be operated to close its valve—that is, when one solenoid is energized the other is deenergized. It is preferred that some means be supplied to provide a very slight flow through the trailing chamber, the right-hand chamber 45, when movement of the cleaner is toward the left as indicated by the arrow in Figure 5, in order to prevent settling filter material from falling into some of the upwardly pointing nozzles 28b and thereby clogging them. Various means for securing such a minor flow could be utilized, but for purposes of illustration I show a bleeder pipe 47 leading from the main inlet pipe 26 and branching into both branch supply pipes, 26a and 26b behind the solenoid operated valves 45a and 45b. Preferably such a bleeder pipe will be provided with a valve 48 to adjust the amount of flow therethrough. Thus, when one valve, such as 45a, is opened by its solenoid and passes a large flow of wash water into one of the chambers, such as 44, a small flow of water will be by-passed through the bleeder pipe 47 into the trailing chamber 45 and out the nozzles 27b and 28b, so as to prevent grains of filter material from becoming lodged therein. Such a by-pass flow will be large enough to keep the nozzles clean but small enough to avoid disturbing the classification and redepositing of the bed material. Obviously, the solenoids 46a and 46b will be energized alternately as the cleaner reaches one end or the other of the paths controlled by the cleaner head.

The pressure liquid for both types of cleaner heads is supplied by means of one or more pressure pumps 50 driven by a suitable motor 51 mounted on the travelling bridge supporting the cleaning mechanism. The waste water, containing the solids removed by the cleaner, is pumped out of the classifier head by means of one or more waste water pumps 52 driven by a suitable motor 53 and is passed through waste water pipe 54 to any desired location.

Figures 3, 4, 7, 8 and 9 show several of the preferred arrangements of the filter beds and of the filter cleaners over and within the beds. Referring to each of Figures 3 and 4, there is shown an annular filter bed surrounding a circular settling tank in the same general manner as in said Lose and Streander patents. The filter bed 11 is suported on the perforated plate 12 in the filter chamber 61 surrounding the settling tank 60. In this form the liquid spills over a weir 62 and into the upper part of the filter chamber 61. It then flows through the filter bed 11 and perforated plate 12 into a lower chamber 62a and then through effluent ports 63 to a channel 64. From here it spills over an effluent weir 65 into the effluent channel 66. The purpose of the effluent weir 65 is to maintain the liquid level over the filter at such an elevation as will provide the best filtering and cleaning results. The intermediate channel 64 is desired as it provides a body of clean water that can be used to clean the filter. This can be accomplished by extending the inlet pipe 55 of the pump 50 into this channel so as to withdraw the necessary water for cleaning. In this embodiment the cleaner, pumps and motor are carried on a revolving bridge 56, the peripheral end of which is carried by a wheel 57 riding on a rail 58 affixed to the upper portion of the tank wall, and the other end of which is supported by suitable means not shown. Such a bridge can be also utilized to carry sludge scrapers, not shown, and can be constructed according to well known practice. The cleaner head 14 and the caisson or hood 15 are rigidly held in spaced relationship to the perforated plate 12, which supports the filter bed 11 by any suitable means, such as rods 59. In most installations, in view of the small size of the filter cleaner and its associated caisson or hood, it will be desirable to permanently place the filter cleaner in the filter bed although it would be obvious that an elevating means could be utilized to withdraw the head from the filter bed when not in operation and to lower it into the filter bed when it is desired to wash the filter. Dirty water from the caisson 15 is pumped through the outlet pipe 30 by means of a pump 52 driven by a suitable motor 53, and is discharged through waste water pipe 54 to any suitable place, such as the inlet to the settling basin 60.

Figures 7, 8 and 9 are views of a rectangular filter bed. In this form the liquid enters the influent flume 70 through a pipe 71 or any other suitable form of liquid entry. The liquid enters the filter 11 through a series of ports 72, or by other means of entry, flows through bed 11, perforated screen 12, into a collecting chamber 73, and thence through effluent ports 74 into the common channel 75 and over effluent weirs 76 into the effluent channel 77. Over the filter bed is mounted a reversible travelling bridge 80 that supports and mounts the various parts of the entire cleaning mechanism. The bridge comprises a suitable framework 81 in which are journaled wheels, 82 riding on rails 83 which extend longitudinally of the filter chamber 84. The bridge supports the wash water pump 50 and its motor 51, the waste water pump 52 and its motor 53, and the cleaner head 40 and caisson 15, by suitable means, such as hangers or supports 85. The waste, or dirty, water may be discharged through the waste water pipe 54 into any suitable place, as into collecting trough 86, which returns waste water by means of pipe 87 into any suitable place such as a preceding settling basin, not shown.

In addition there is also shown in Figures 7, 8 and 9 an arrangement for by-passing liquid from the influent flume 70 into and flushing out the lower compartment 73 of the filter chamber. For this there is shown drainage gate 90 in the common influent flume 70, delivering water into a distributing channel 91, which is connected to the collecting chamber 73 by flushing ports 92, thus providing a connection between the influent flume 70 and the lower filter bed collecting chamber 73. A diversion gate 93 permits closing of flow through the filter, as when draining prior to scouring the collecting chamber 73.

The cleaning of the filter bed is accomplished by means hereinbefore described. At the time of cleaning, the mechanism may be automatically placed in operation by means of a float switch, as in said Streander patent, or any other automatic means, controlled by the level of the liquid over the bed, or manually. Referring to Figures 1 and 4, when the cleaning mechanism is placed in operation the cleaning head 14 is moved through the filter bed 11. At the same time, the pressure liquid pump 50 and the waste liquid pump 52 are automatically started. The pressure liquid pump supplies liquid under the required pressure to the cleaner head 14 through the pressure liquid pipe 26.

This pressure water issues from the cleaner head through the nozzles 27 and 28 in the lower portion of the cleaner head. These nozzles are so arranged that the lower ones 27 will cause the issuance of jets of liquid at a high velocity forwardly and against the supporting plate 12, which serves to undercut and suspend the part of the bed immediately ahead the cleaner head. The upper jets 28 are so arranged that they will cause the issuance of jets of liquid at a high velocity along and generally parallel to the inclined face 24 of the cleaner head.

The combined action of these two sets of nozzles suspends the filter media within the limits the the classifier head 15 and lifts the filter media over the top of the cleaner head 14. At the same time, the high velocity of the two sets of water jets thoroughly agitates the filter media, thereby separating and placing in suspension the foreign solids retained in the filter medium during the filtering operation. The foreign solids are then separated from the sand in the classifier head, by providing an upward flow of liquid within the classifier head of sufficient velocity to keep the foreign matter in suspension, but not high enough to float the filter media.

The cleaner head 14 with its inclined face 24 provides a solid barrier moving through the full depth of the filter media; the hydraulic action of the upper and lower jets 27 and 28, serving to suspend, agitate and lift the sand from the forward side to the rear side of the cleaner head 14. In this lifting and agitating of the filter bed material, the entire cleaning action is confined within the limits of the classifier head 15. In the cleaning action the larger particles of the filter media, being heavier, first fall on the supporting plate 12 and are followed by other particles in the order of their size, so that when the cleaning action is completed there is provided a filter medium graded with the coarse particles on the bottom and the fine particles on the top of the filter bed.

The operation of the cleaning mechanism illustrated in Figure 5 is similar to that described for the mechanism shown in Figure 1 excepting that the cleaner shown in Figure 5 is for a two direction travel. In this arrangement the cleaner head 40 is divided into two separate chambers 44 and 45 by means of the dividing wall 43; each half being provided with nozzles 27a and 28a for one-half and 27b and 28b for the opposite half. When travelling toward the left pressure water is supplied to the left hand side of the cleaner head by a separate pressure water pipe 26a and this water issues through nozzles 27a and 28a. When the travel is reversed pressure water is supplied to the right hand side by the pressure water pipe 26b and issues through nozzles 27b and 28b. The change from supply of pressure liquid by pipe 26a to supply by pipe 26b may be accomplished by placing in each pipe a solenoid-operated valve which valves are so wired that upon change of cleaner direction one valve is opened and the other valve is closed.

Minute particles of foreign solids that pass through the filter media may lodge in the lower chamber of the filter bed. To prevent clogging in the lower chamber and/or septization when such solids are of organic form, as in sewage, these solids must be periodically removed. In the usual type of filter bed this is done by manually extending a hose into the chambers and flushing it out with pressure liquid. Or the entire filter medium and the supporting plates are removed and the lower chamber is then cleaned. In this invention novel means are provided to clean out the lower chamber. Referring to Figures 7, 8 and 9, and the previous description, this flushing is accomplished as follows: A series of diversion gates 90 are provided that connect the influent flume 70 to a series of pressure chambers 91 under the influent flume. When the lower chamber is to be cleaned the diversion gate 93 is closed to stop flow through the filter and permit water therein to drain therefrom. At the same time, one or more of the drainage gates 98 (as shown at left of Figure 8) in the common flume 70 are opened. The diversion gate 93 is then raised and influent liquor passes into the distributing channel 91. This is discharged through a series of ports 92 into the part of the lower collecting chamber 73 connected to the distributing channel. The liquid passes through the ports 92 at a high velocity and scours and flushes out any sediment contained in the lower chamber, the flushing liquid flowing through the effluent ports 74 and into the common channel 75. It then passes over the weir 76 and into the effluent, or it may be returned to another part of the plant for subsequent treatment.

The float controlled switches referred to in the specification may be such as are disclosed in my prior Patent No. 2,086,829 and the float-control of valves may be effected by opening and closing solenoid operated switches.

It will be observed that with the apparatus shown and operating as described I secure several improved results, including a more complete and thorough washing and scouring of the filter bed whereby it is more effectively cleansed and also a complete renewal or resetting of the bed including a classifying or grading during the resetting whereby larger grains are below and smaller grains above in the bed, it being well known that with such arrangement filtration is more effective and also that there is less penetration of the bed by removed solids so that the bed is kept in better condition. These results are secured by advantageous features of construction referred to above or apparent on consideration of my disclosure. These features include the plow or barrier wall extending the width of the bed and of height corresponding to the depth of the bed over which the bed material is lifted during the washing operation, the undercutting jets along the forward lower edge of the barrier that loosen and raise the bed from the screen, thus facilitating the forward movement of the barrier and preventing injury to the bed support by the jamming of material under the moving barrier, the placing of additional orifices to provide jets that scour the bed material while lifting it over the barrier, the means for preventing bed material from entering through idle orifices, the hood or caisson which confines the action within a limited area or volume in which cleaning and scouring is fully effective, the classifying and redepositing action as the material falls behind the barrier, and other features and actions.

It should be understood that various changes may be made and that various features may be used without others, without departing from the true scope and spirit of the invention.

What I claim is:

1. A travelling cleaning device adapted to move along a filter bed in which the filter medium is composed of granular material, said travelling cleaning device comprising an open-bottom caisson movable over the surface of the bed, a hollow transverse cleaner head beneath the caisson and movable therewith, said cleaner head being so positioned that its bottom is closely adjacent the bottom of the filter bed and having a continuous leading face extending substantially the length of said caisson and of a height substantially the depth of said bed, means to supply water under pressure to within said head, orifices through said face at its lower edge and positioned to direct jets of water forwardly and downwardly, whereby the bed material will be loosened and lifted over the head as it advances, and means for removing dirty water from the caisson.

2. A travelling cleaning device adapted to move along a filter bed in which the filter medium is composed of granular material, said device comprising an open-bottom caisson movable over the surface of the bed, a hollow transverse cleaner head with a continuous leading face extending substantially the length of the caisson and from the top to the bottom of the bed, said head being beneath the caisson and movable therewith, orifices through said face at its lower edge positioned to direct jets of water forwardly and downwardly against the bottom of the filter bed and other orifices through the lower portion of said face and positioned to direct jets of water upwardly and substantially parallel to said face, means for supplying liquid under pressure to the interior of said head, and means for withdrawing dirty liquid from the interior of said caisson.

3. A device for the cleaning of a filter bed composed of a granular substance, said device being movable over and through the filter media and comprising a cleaner head, said cleaner head being hollow and having a rearwardly and upwardly inclined leading surface of a height approximating the depth of the bed, two rows of discharge orifices through the leading surface of said cleaner head, one row of orifices along the lower edge of said surface being positioned to direct discharge therethrough forwardly and downwardly toward the bottom of the bed, the other row being positioned above said first row to direct discharge therethrough upwardly and substantially parallel to said inclined surface, means to deliver liquid under pressure to within the cleaner head, and means for withdrawing dirty liquid from adjacent the cleaner head.

4. A device for the cleaning of the filter media of a filter bed composed of granular substances, said device being movable over and through the said filter media and comprising a hollow cleaner head having a continuous leading face of a length approximately the width of the bed and of a height approximately the depth of the bed, a plurality of orifices through the lower part of the said leading face of the cleaner head so positioned as to direct discharge therethrough forwardly and downwardly against the material at the bottom of the bed, whereby the filter material in the lower part of the bed in front of said head is undercut and suspended in liquid, a plurality of other orifices in said leading face so positioned as to direct discharge therethrough upwardly and generally parallel to the face of the cleaner head, whereby the filter media on the front side of the cleaner head is lifted over the head and to the rear thereof, means for supplying liquid under pressure to said head, means for collecting liquid discharged from said orifices, and means for removing dirty water from the collecting means.

5. A device for the cleaning of the filter media of a filter bed composed of a granular substance of varied size carried on a filter bed support, said device being movable over and through said variable size filter media and comprising a cleaner head having a leading face of a height approximating the depth of the bed and a length approximating the width of said bed, said cleaner head being hollow and having discharge orifices through said face so positioned at the lower edge thereof as to direct discharge therethrough downwardly and forwardly at an angle against the filter media support, whereby the filter media adjacent such support is undercut and suspended in liquid, other orifices through said face so positioned as to direct discharge therethrough generally parallel to and upwardly along the face of the cleaner head, whereby the filter media in front of the cleaner head is scoured and lifted over the head and to the rear thereof and the varied sized filter media is deposited in graded layers with the coarse particles on the bottom and the finer particles on the top of the filter bed, a caisson over said cleaner head, means for supplying liquid under pressure to the interior of said cleaner head, and means for removing dirty liquid from the caisson.

6. A reciprocable device for the cleaning of the filter media of a granular filter bed, said device being movable over and through the said filter media and comprising a cleaner head of a length approximately the width of the filter bed and of a height approximately the depth of the filter bed, said head being hollow and divided into two longitudinal compartments with upwardly and rearwardly inclined outer faces, means including discharge orifices through said outer faces, some of said orifices being located along the lower edge of each face and positioned to direct discharge therethrough outwardly and downwardly and others of said orifices being positioned to direct discharge therethrough upwardly and substantially parallel to said faces, whereby the filter media at the leading face is agitated and caused to pass over the cleaner head, a carriage supporting said cleaner head in said filter bed with its lower portion adjacent the bottom of said filter bed, means to move said carriage longitudinally of said bed, means for reversing the direction of movement of said carriage, means, including a conduit, for selectively supplying liquid under pressure to the leading one of said compartments, and means for removing dirty water from adjacent the cleaner head.

7. In combination with a reversible device for the cleaning of the filter media of a filter bed composed of a granular substance, said device being reciprocable over and through the said filter media, an improved cleaner comprising a cleaner head of length approximately the width of said bed and of a height approximately the depth of the bed, said head being hollow and being divided by a longitudinal partition into two longitudinal compartments, said compartments being each provided with orifices through the outer wall of each compartment, a portion of said orifices being located at the lower edge of said walls and directed downwardly and outwardly and others of said orifices being located on the outer wall adjacent the bottom thereof and directed upwardly and substantially parallel to said wall, whereby the issuing jets will suspend filter media in advance of said head and lift said media over the head to the opposite side thereof, means for alternately supplying liquid under pressure to each of said compartments, and means for removing dirty liquid from around the cleaner head.

8. A reversible device for the cleaning of the filter media of a granular filter bed, said device being reciprocable over and through the said filter media and comprising a cleaner head of a length approximating the width of the filter bed and of a height approximating the depth of the filter bed, and having a continuous upwardly inclined face on each side, said head being hollow and divided by a longitudinal partition into two longitudinal compartments, a plurality of orifices through the lower edge of said faces so positioned as to discharge jets of liquid at an outward and downward angle against the filter bottom, whereby the filter media adjacent the bottom of the filter bed is undercut and suspended, and other orifices through said faces so positioned as to discharge jets of liquid upwardly along the face of the head, whereby the filter media from the front of the head is agitated and lifted over the head to the rear thereof, means including a conduit communicating with said compartments for supplying a large quantity of liquid under pressure to said compartments, means associated with said conduit for selectively controlling the flow of liquid from the conduit to the compartments, whereby a large quantity of liquid will be supplied to one of said compartments and a small quantity of liquid will be supplied to the other of said compartments, and means for withdrawing dirty liquid from around the cleaner head.

9. In a device for cleaning a granular filter bed, a cleaner head movable through the filter bed, said head being in the form of an enclosed compartment of length substantially equal to the width of the bed and of a height substantially equal to the depth of the bed, said head having a rearwardly inclined continuous forward face for the full length and height thereof, a first row of discharge orifices in and spaced along the lower leading edge of said face, said orifices being positioned to direct discharge therethrough forwardly and downwardly, a second row of discharge orifices in and spaced along said face adjacent but above said first row, a third row of discharge orifices in said face above said second row, the orifices of said second and third rows being positioned to discharge jets upwardly and generally parallel to said forward face of said head, and inlet means for supplying liquid under pressure to within said head.

10. A device for cleaning a granular filter bed comprising a cleaner head, said cleaner head being hollow and having a rearwardly inclined leading surface of a length approximating the width of the filter bed and a height approximating the depth of the bed, at least two rows of discharge orifices through said leading surface, one row of said orifices being positioned to direct discharge therethrough forwardly and downwardly toward the bottom of the filter bed and at least one row of orifices being positioned to direct discharge therethrough upwardly substantially parallel to said inclined surface, means to deliver liquid under pressure to within the cleaner head, means to move said cleaner head forwardly through said bed, a classifier head above said cleaner head and adapted to move therewith, said classifier head being in form of a caisson of length corresponding to that of the cleaner head, said caisson being open below and closed at the top, sides and ends, and leveling shoes on the front and rear lower edges of said caisson, said classifier head being so spaced above said cleaner head that the leveling shoes contact the top of the filter bed.

11. The apparatus of claim 3 wherein the means for withdrawing dirty liquid from adjacent the cleaner head comprises a caisson of length corresponding to that of the cleaner head mounted above said cleaner head and adapted to move therewith, said caisson being open below and closed at the top, sides and ends thereof, and means including a pump to remove liquid from the caisson.

12. The apparatus of claim 6 comprising also a second conduit means for supplying water, under reduced pressure, into the trailing compartment.

13. In combination with a device for cleaning a granular filter bed, said device being movable over and through the filter bed, and including a plurality of discharge orifices movable through the bed and means for withdrawing dirty liquid from adjacent said orifices, an improved cleaner head comprising a hollow transverse plow of a length approximating the width of the filter bed to be cleaned, and a height approximating the depth of the filter bed, said plow having a continuous leading face for the full length and height thereof, not less than two rows of discharge orifices through the leading face of said plow, one row of said orifices being positioned to direct discharge therethrough forwardly of said plow and downwardly and the other row being positioned to direct discharge therethrough upwardly and substantially parallel to said face, and means for delivering liquid under pressure to the interior of said plow.

14. In a device for cleaning a granular filter bed, an improved cleaning head comprising a plow of a height approximately the depth of the bed to be cleaned and of a length approximately the width of said bed, said plow being hollow and divided by a longitudinal partition into two longitudinal chambers, each chamber being provided with an upwardly inclined outer face, each of said chambers being provided with not less than two rows of orifices through the leading face thereof, one row of said orifices being positioned at the lower edge of said face to direct discharge therethrough forwardly and downwardly, and the other row of orifices being positioned above and adjacent said first row to direct discharge therethrough upwardly and substantially parallel to said inclined surface, and means to deliver liquid under pressure to within each of said chambers.

15. In a device for cleaning a granular filter bed, said device being movable over and through the filter bed, and including a plurality of discharge orifices movable through the bed and means for withdrawing dirty liquid from adjacent said orifices, an improved cleaner head comprising a hollow transverse plow extending from adjacent one side of said bed to adjacent the other side and from adjacent the bottom of said bed to adjacent the top thereof, said plow having a continuous leading face for the full length and height thereof and a row of orifices through said face positioned to direct discharge therethrough forwardly and downwardly ahead of said plow, and means for delivering liquid under pressure to the interior portion of said plow.

16. In a filter bed cleaner of the type which is moved over and through the filter bed to wash dirt from the filter medium, means for lifting material from a section of the filter bed from its support and washing, during such lifting, and for redepositing on its support and classifying during such depositing, such lifted and washed material, said means comprising a rearwardly inclined wall of a length approximately the width of the filter bed and of a height approximately the depth of the filter medium, a series of downwardly and forwardly discharging orifices at the lower edge of said wall and another series of orifices through said wall discharging upwardly and generally parallel to said wall, and means for supplying water under pressure to said orifices.

17. A process for cleaning a granular filter bed which comprises discharging a plurality of adjacent streams of water under pressure downwardly and forwardly adjacent the bottom of the filter bed, discharging other streams of water under pressure upwardly and rearwardly from a position above said first mentioned streams, the force of said last mentioned streams being sufficient to carry filter bed material to a level adjacent the top of the filter bed, removing dirty water from said moving material, reforming the filter bed rearwardly of said streams by depositing filter bed material in a quiescent zone rearwardly of said streams, and moving said streams forwardly along the bed until the entire bed has been cleaned and reformed.

18. A process of progressively cleaning and reclassifying a granular filter bed which comprises the steps of undercutting by and suspending in a stream of water under pressure the entire filter bed material in a vertical section of the bed, washing and lifting such suspended material to a level adjacent the top level of the bed by another stream of water under pressure, separating the washed filter bed material by gravity from the water, withdrawing the wash water to waste, progressively moving the streams of water forwardly within said bed to undercut and lift further vertical sections thereof, and simultaneously classifying and depositing washed filter bed material behind the forwardly moving streams.

19. A process for cleaning a granular filter bed comprising progressively isolating narrow transverse sections of the filter bed from downflow of liquid therethrough, dividing the filter bed in said isolated section longitudinally into a forward cleaning zone and a rearward depositing zone, discharging a plurality of streams of water downwardly and forwardly adjacent the bottom of said cleaning zone, discharging a plurality of other streams of water upwardly in said cleaning zone from a position rearwardly of said first mentioned streams, thereby lifting substantially all of the filter bed material upwardly by said streams to a level above the normal level of said filter bed, depositing the lifted material in the rearward quiescent zone, and withdrawing dirty water from above said bed in said isolated section.

PHILIP B. STREANDER.